United States Patent
Chambers

[15] 3,666,923
[45] May 30, 1972

[54] CONTROL APPARATUS HAVING FULL CURRENT PULSE LOAD CONDUCTION

[72] Inventor: William W. Chambers, Anaheim, Calif.
[73] Assignee: Robertshaw Controls Company, Richmond, Va.
[22] Filed: June 8, 1970
[21] Appl. No.: 44,381

[52] U.S. Cl. ..........................................219/499
[51] Int. Cl. .....................................H05b 1/02
[58] Field of Search ..................323/22, 40, 75; 307/39, 117; 219/494, 499, 501

[56] References Cited

UNITED STATES PATENTS

| | | | |
|---|---|---|---|
| 2,994,759 | 8/1961 | Lipman | 219/501 |
| 3,419,708 | 12/1968 | Niewyk et al. | 219/501 |
| 3,489,881 | 1/1970 | Chambers | 219/499 |

Primary Examiner—Bernard A. Gilheany
Assistant Examiner—F. E. Bell
Attorney—Fulwider, Patton, Rieber, Lee & Utecht

[57] ABSTRACT

Control apparatus for connection with a pulsating current source and to control current flow to a load. The control apparatus consists of a sensing circuit including a first gate operated switch means for controlling current flow through resistance means in the bridge to create a voltage drop thereacross. A control circuit is included which has a controlled switch means for controlling the current to the controlled load. The controlled switch means includes a gate responsive to a predetermined current level to render such control switch means conductive to complete the circuit through the load. Current storage means is connected across the resistance means and with the gate of the controlled switch for storage of current during current pulses in the bridge circuit for subsequent delivery to the controlled switch gate to trigger such controlled switch during subsequent pulses. Consequently, the controlled switch means will be rendered conductive early in each pulse of current to conduct substantially full current pulses to the load.

10 Claims, 1 Drawing Figure

Patented May 30, 1972
3,666,923
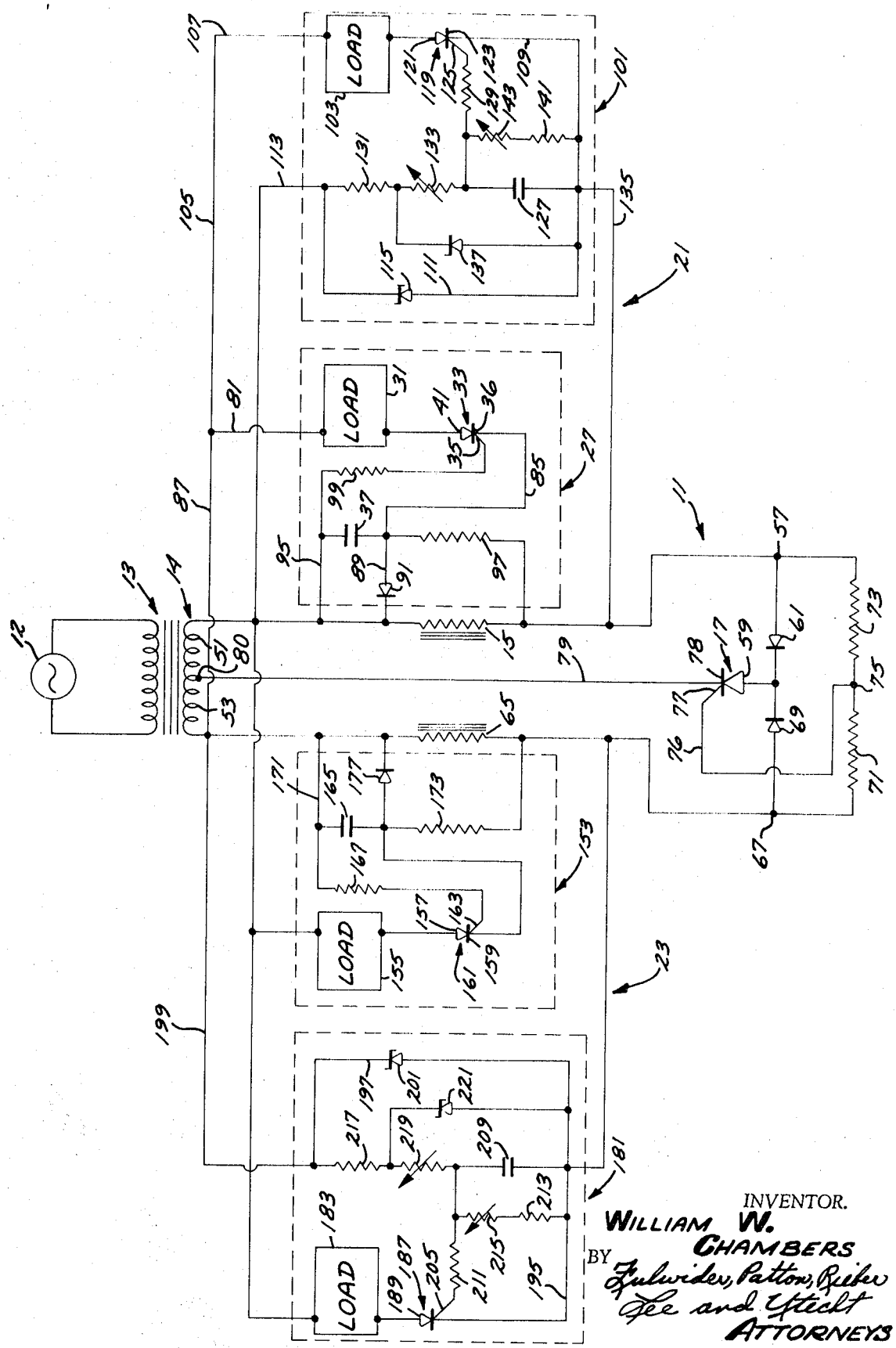
INVENTOR.
WILLIAM W.
CHAMBERS
BY Fulwider, Patton, Rieber
Lee and Utecht
ATTORNEYS 3,666,923

1

CONTROL APPARATUS HAVING FULL CURRENT PULSE LOAD CONDUCTION

BACKGROUND OF THE INVENTION

1. Field of the Invention

The present invention relates to temperature control apparatus for use with pulsating or alternating current sources.

2. Description of the Prior Art

Prior art temperature control apparatus for use with alternating current sources commonly employ a control bridge having a switch means, such as a silicon controlled rectifier that responds to an unbalance of the bridge to provide current flow through a load. However, in an apparatus of this type the silicon controlled rectifier characteristically does not fire until an AC pulse on the triggering gate reaches approximately 90°. Consequently, the switch conducts for only a fraction of the entire pulse, resulting in the load receiving only a fraction of the total power available in the pulse. Further, such a temperature responsive bridge is commonly associated with a center tapped transformer coil so that the voltage applied to its operator is only one-half the total voltage available across the secondary coil. Control circuits have been proposed which incorporate three silicon controlled rectifiers to produce triggering of the SCR controlling current flow to the load but such circuits suffer the shortcoming of being relatively expensive to manufacture.

SUMMARY OF THE INVENTION

The control apparatus of present invention is characterized by a control bridge including a resistor and a first switch means that is responsive to a predetermined amount of unbalance in the bridge to complete the circuit through the resistor to deliver a pulsating current thereto. An operator control circuit for controlling a current to a load is connected to a pulsating current source and includes controlled switch means which is responsive to a predetermined current level to close and complete the circuit through the load. A current storage means is connected across the bridge resistor and is connected in circuit with the controlled switch to store current during current pulses in the bridge circuit for subsequent delivery to the controlled switch means to render such switch means conductive during subsequent pulses of current in the operator circuit.

An object of the present invention is to provide a control apparatus for use with a pulsating current source wherein the switch means controlling current through the controlled load is triggered early in the current pulse to provide conduction to the load throughout substantially the entire pulse.

An additional object of the present invention is to provide current to the operator during the half cycle the sensing device is inoperative.

Another object of the present invention is to provide a control apparatus of the type described wherein the control bridge includes a center tapped transformer coil and wherein the controlled load can be connected across the entire coil.

Another object of the present invention is to provide a control apparatus of the type described wherein interference with radio frequency is minimized.

A still further object of the present invention is to provide a control apparatus of the type described wherein the current in the operator circuit bypasses the bridge resistor.

It is also an object of the present invention to provide a control apparatus of the type described that includes a second stage control circuit for controlling a load that is operative to provide additional heat to the environment.

These and other objects and the advantages of the present invention will become apparent from a consideration of the following detailed description when taken in conjunction with the accompanying drawing.

DESCRIPTION OF THE DRAWING

The single FIGURE shown in the drawing is an electrical schematic of a control apparatus embodying the present invention.

DESCRIPTION OF THE PREFERRED EMBODIMENT

The control apparatus of present invention includes, generally, a temperature sensing bridge 11 having current provided thereto by a transformer 13 connected with an AC power source 12 and including a secondary coil 14. The bridge 11 includes a heating resistor 15 through which the current is controlled by a silicon controlled rectifier (SCR), generally designated 17. Connected in circuit with the bridge 11 is a multiple stage heating operator control circuit 21 and a multiple stage cooling operator control circuit 23. The first stage 27 of the heating control circuit 21 includes a temperature change unit operator, or load, 31 connected across the secondary coil 14 and having the current therethrough controlled by a controlled silicon controlled rectifier (SCR) 33 which has a capacitor connected between its gate 35 and cathode 36. Thus, when the temperature being sensed by the bridge 11 falls below a predetermined level, the bridge will be unbalanced sufficiently to trigger the triggering SCR 17 on alternate half cycles. On the alternate half cycles, when the right hand end of the coil 14 is positive with respect to the left hand end, the SCR 17 will conduct a positive current pulse to produce a voltage drop across the heating resistor 15 to charge the capacitor 37. On alternate half cycles when the left hand end of the secondary transformer coil 14 becomes positive with respect to the right hand end the anode 41 of the controlled SCR 33 will be positive with respect to the cathode 36. Concurrently, the charge on the capacitor 37 is being discharged into the gate 35 of the controlled SCR 33 and such SCR will be rendered conductive as soon as the anode 41 becomes positive with respect to the cathode 36.

The temperature sensitive bridge 11 is formed, in part, by the secondary transformer coil 14 which is center tapped at 49 to form two substantially equal halves 51 and 53. The coil half 51 is connected in series with the bridge resistor 15 to cooperate therewith in forming one leg of the bridge 11, such leg terminating at a juncture 57. The juncture 57 is connected with the anode of the triggering SCR 17 through a diode 61. The second half 53 of the transformer secondary coil 14 is connected in series with a cooling resistor 65 which cooperates therewith to form a second leg of the bridge 11, such second leg terminating at a juncture 67. The juncture 67 is connected with the anode 59 of the triggering SCR 17 through a diode 69. The third and fourth legs of the bridge 11 are formed by a thermistor 71 and a variable resistor 73, respectively. The thermistor 71 and thermistor 73 are connected together at a juncture 75 which is connected with the gate 77 of the SCR 17 by means of a lead 76. The cathode 78 of the SCR 17 is connected with the center tap 80 of the secondary coil by means of a lead 79.

The operator 31 of the first stage control circuit 27 is connected across the secondary transformer coil 14 by means of leads 81, 83, 85 and 89, the lead 89 including a diode 91 which blocks current bleed-off from the capacitor 37 to the bridge circuit 11.

The capacitor 37 is connected across the bridge heating resistor 15 by means of a lead 95 and a resistor 97 for restricting current leak-off through the bridge resistor 15. The capacitor 37 is connected between the gate 35 and cathode 36 of the controlled SCR 33 by means of a discharge control resistor 99 and the lead 85.

A second stage heater control circuit, generally designated 101, is provided for controlling current flow through a second stage heat unit operator 103 which is connected across the secondary transformer coil 14 by means of leads 105, 107, 109, 111 and 113, the lead 111 including a diode 115, the purpose of which will appear hereinafter.

A second controlled SCR, generally designated 119, has its cathode 121 and anode 123 connected in series with the operator 103. The gate 125 and cathode 121 of the SCR 119 are connected across a capacitor 127 by means of the lead 109 and a resistor 129 which controls the discharge rate to such gate. The capacitor 127 is connected in series with a constant resistor 131 and a variable resistor 133 for controlling the charge rate thereof. The capacitor 127 is connected across the bridge heating resistor 15 by means of the lead 113, resistors 131 and 133 and a lead 135. A Zener diode 137 is connected across the capacitor 127 to control the current thereto at a level below the line level received from the source 12 to thereby assure a constant charging current on 127 irrespective of line voltage fluctuations.

Connected across the capacitor 127 is a resistor 141 for cooperating with the parallel connected resistor 129 to control the discharge rate of the capacitor 127 and also a negative temperature coefficient thermistor 143 which is responsive to temperature variations to automatically compensate the discharge rate of the capacitor 127.

The multiple stage cooling control circuit 23 is similar to the heating control circuit 21 and includes a first stage operator circuit, generally designated 153, for controlling an operator 155 which is connected in series with the anode 157 and cathode 159 of a controlled SCR, generally designated 161. Connected between the gate 163 and cathode 159 of the SCR 161 is a capacitor 165 having a resistor 167 connected in series therewith for controlling the discharge rate to such gate. The capacitor 167 is also connected across the bridge cooling resistor 65 by means of a lead 171 and a resistor 173 which restricts bleed-off from such capacitor. Connected with cathode 159 of the SCR 161 and in parallel with the resistor 173 is a diode 177 which blocks capacitor discharge during negative going current pulses in the bridge 11 and defines a path for current through the operator 155 to bypass the bridge resistor 65.

Again, the second stage control circuit, generally designated 181, of the cooling circuit 23 is similar to the second stage 101 of the heating control circuit 21 and includes an operator 183 connected across the secondary transformer coil 14. Connected in series with the operator 183 is the anode 189 and cathode 191 of an SCR, generally designated 187. The cathode 191 is connected with the left hand side of the secondary transformer coil 14 by means of leads 195, 197 and 199, the lead 197 including a bypass diode 201, the purpose of which will appear hereinafter. Connected across the bridge cooling resistor 65 and also between the cathode 191 and the gate 205 of the SCR 187 is a capacitor 209. Connected in series between the capacitor 209 and the gate 205 are parallel connected resistors 211 and 213 for controlling the discharge rate of the capacitor to such gate. Connected in series with the resistor 213 is a thermistor 215 which is responsive to temperature variations to adjust the discharge rate of the capacitor 209 to maintain a constant overall discharge rate.

A constant resistor 217 and a variable resistor 219 connect the capacitor 209 across the bridge resistor 65 for controlling the charge rate of such capacitor.

Connected across the capacitor 209 is a Zener diode 221 which maintains the current supply thereto at a constant level somewhat below the level delivered from the secondary transformer coil 14.

In operation, the thermistor 71 of the temperature responsive bridge 11 will be placed in the environment which is to have its temperature controlled by the temperature change unit (not shown) operated by the respective first and second stage heating operators 31 and 103 and the respective first and second stage cooling operators 155 and 183. The AC power source 12 may then by connected with the transformer 13 to induce an AC current in the secondary coil 14 to provide in-phase current pulses in each half 51 and 53 of such secondary coil. As long as the temperature of the thermistor 71 remains within a predetermined range, the bridge 11 will remain generally balanced and no current flow will be experienced therein. However, when the environment of which the temperature is being controlled drops below the selected temperature range, the thermistor 71 will be cooled to thereby raise the resistance in the bridge leg defined thereby. On the subsequent positive going current pulse, the juncture 75 will be positive with respect to the center tap 39 to thereby effect current flow into the electrode of the SCR gate 77. When the current in the gate electrode 77 becomes sufficiently high to trigger the SCR 17, current will commence flowing through the bridge half define by the diode 61, anode and cathode of the SCR 17, center lead 79, coil half 51 and heating resistor 15.

When the current pulse on the secondary coil 14 falls sufficiently low to discontinue the triggering current to the SCR gate 77 such SCR will be rendered nonconductive and during the subsequent negative going pulse, the juncture 75 will be negative with respect to the center tap 39 to thereby produce a negative current on the gate 77 which will be ineffective to trigger the SCR 17, it being realized that the SCR is of the nature that it is only triggered by a positive current. However, on the subsequent positive going half cycle, the juncture 75 will again be positive with respect to the center tap 39 thereby resulting in the SCR again being rendered conductive. As a consequence, it will be apparent that the resulting current through the heating bridge resistor 15 is a pulsating direct current with no current being conducted during the negative half cycle of the current in the secondary transformer 14.

The reader will recall that for an SCR to become conductive, its anode must be positive with respect to its cathode and its gate must also be positive with respect to its cathode. In this regard, it will be noted that the control bridge SCR 17 is conductive when the right hand end of the secondary transformer coil 14 is positive with respect to its left hand end. At this time the anode 41 of the controlled SCR 33 would be negative with respect to its cathode 45 and such SCR would not be conductive even though a positive triggering current is being imposed on its gate 35. Concurrently, the top side of the capacitor 37 will be maintained positive with respect to the bottom side to cause such capacitor to charge. On the subsequent half cycle when the left hand end of the secondary transformer coil 14 is positive with respect to the right hand end the charge on the capacitor 37 will be blocked from flowing into the bridge 11 by means of the diode 91 and will be restricted from leaking through the bridge resistor 15 by means of the resistor 97. At this time the anode 41 of the controlled SCR 33 is positive with respect to its cathode 45 and the capacitor 37 will discharge through the discharge control resistor 99 to provide a triggering current to the gate 35 of such SCR. Since the triggering current from the capacitor 37 is imposed on the gate 35 continuously, the controlled SCR 33 will become conductive as soon as the anode 41 becomes positive with respect to the cathode 45 thereby providing for current conduction for a full half of the current cycle. The current from the coil 14 will follow a path through the operator 31, SCR 33 and diode 95 thereby bypassing the bridge resistor 15 to impose substantially the entire voltage from the coil 14 on the operator 31. When the right hand end of the transformer secondary coil again becomes positive with respect to the left hand end a positive current pulse is conducted through the bridge heating resistor 15 for storage in the capacitor 37. Again, the charge on the capacitor 37 will be conducted through the discharge resistor 99 to the gate of the controlled SCR 33 during the subsequent half cycle of the current in the transformer secondary coil 14 to again provide current through the operator 31. It will be realized that the operator 31 can be utilized to control a gas valve leading to a furnace or the like for heating the environment in which the thermistor 71 is disposed.

If actuation of the temperature change unit controlled by the operator 31 is insufficient to heat the environment to prevent continued lowering of the environmental temperature, the thermistor 71 will continue to be cooled further increasing its resistance and rendering the control circuit juncture 75 more positive with respect to the center tap 39 each time the right hand end of the secondary transformer coil 14 is positive with respect to the left hand end. This will result in the triggering current being imposed on the bridge SCR gate 77 earlier in the current cycle to thereby provide conduction throughout a greater portion of the cycle. This feature is utilized to energize the second stage control circuitry 101. In the particular circuitry shown, the adjustable resistor 133 is set to enable the current pulse through the bridge heating resistor 15 to charge the second stage capacitor 127 when such pulse exceeds approximately 135° of the total cycle. Thus, when the bridge SCR 17 is conductive for more than 135° the second stage capacitor 127 will be charged to deliver a triggering current to the gate 125 of the second stage SCR 119. Consequently, when the left hand end of the transformer secondary coil 14 is positive with respect to the right hand end the second stage SCR anode 121 will be positive with respect to its cathode 123 and the capacitor 127 will provide a triggering current to the gate 125 to energize the operator 103 to thereby actuate a second stage heat change unit (not shown). This second stage temperature change unit may be a second gas valve for increasing the gas flow rate to a furnace, or the like.

The negative temperature coefficient thermistor 143 serves to automatically adjust the discharge rate of the capacitor 127 to compensate for variations in temperature.

The first and second stage heating operators 131 and 103 will remain energized until the thermistor 71 in the bridge 11 is heated sufficiently to bring such bridge 11 sufficiently back into balance to cause the bridge SCR 17 to conduct less than 135 degrees of the AC current cycle. When the conduction angle of the SCR 17 drops below such said 135 degrees, the second stage capacitor 127 will not have sufficient time to charge and will fail to deliver a triggering current to the gate 125 of the second stage SCR 119 thereby de-energizing the second stage operator 103. Finally, when the bridge 11 is again balanced, the bridge SCR 17 will become nonconductive thereby discontinuing current flow through the bridge heating resistor 15 to discontinue charging the capacitor 37 thereby resulting in rendering the first stage SCR 33 nonconductive.

When the temperature in the environment in which the thermistor 71 is disposed raises above a predetermined range, the thermistor will be heated sufficiently to lower the resistance in the leg defined thereby to unbalance such bridge. Thereafter, when the left hand end of the coil 14 is positive with respect to the right hand end, the juncture 75 will be positive with respect to the center tap 80 and the anode 59 will be positive with respect to the cathode 78, as the current pulse approaches 90° the current to the gate 77 will reach the triggering level thereby rendering the SCR 17 conductive and initiating current flow through the bridge cooling resistor 65. Current flow through the resistor 65 will effect charging of the capacitor 165 during half cycles which drive the left hand end of the coil 14 positive. On alternate half cycles the right hand end of the coil 14 will be positive with respect to the left hand end to render the anode 157 positive with respect to the cathode and the capacitor 165 will discharge into the gate 163 to trigger such SCR to cause current flow through the operator 155.

As in the control circuit 101 for the second stage heating unit (not shown) continued heating of the thermistor 71 will further lower the resistance in the bridge leg defined thereby to increase the length of time during which current flows to the bridge cooling resistor 65 sufficiently to charge the capacitor 209 through the resistors 217 and 219 for subsequent discharge into the gate 205 of the second stage cooling SCR 187 for triggering such SCR during the subsequent half cycle of the transformer secondary coil 14 to energize the second stage cooling operator 183.

From the foregoing detailed description it will be apparent that the control apparatus of present invention provides a system wherein current may flow through the operator during an entire half phase of a pulsating DC current. Further, the load or operator may be connected across the full transformer secondary coil to impose the total voltage available on the load. Also, the radio frequency interference is much less than that for prior art thermal control systems which employ SCRs that trigger only at about 90° after the voltage thereacross has been raised to a relatively high level.

Various modifications and changes may be made with regard to the foregoing detailed description without departing from the spirit of the invention.

What is claimed is:

1. Control apparatus for use with a controlled load, said apparatus comprising:

temperature responsive control circuit means for connection with a pulsating current source and including a gate controlled first switch means connected with voltage drop resistance means and a temperature responsive resistor connected with the gate of said switch means and responsive to a predetermined temperature to impose a triggering signal on said gate to initiate current flow through said switch means and through said resistance means on selected half cycles of said current;

a load circuit including controlled switch means for connection in circuit with said controlled load and said source and responsive to a predetermined level of current to couple said source in circuit with said load;

current storage means having sufficient storage capacity to be charged sufficiently by the voltage developed across said resistance means during selected half cycles of said current of said selected value to discharge said predetermined level of current on respective subsequent half cycles to render said controlled switch means conductive substantially throughout said subsequent half cycles;

a charge circuit connecting said storage means across said resistance means; and a discharge circuit connecting one side of said storage means and with said controlled switch means whereby occurrence of said predetermined temperature will actuate said first switch means to initiate current flow of said selected value through said resistance means to charge said storage means sufficiently on each said selected half cycle to discharge said current of said selected value on each said subsequent half cycle to render said controlled switch conductive substantially throughout said subsequent half cycles.

2. Control apparatus as set forth in claim 1 wherein:
said control circuit includes a secondary transformer coil connected across said load and said controlled switch means.

3. Control apparatus as set forth in claim 1 wherein:
said controlled switching means includes a silicon controlled rectifier having its gate circuit connected across said current storage means.

4. Control apparatus as set forth in claim 1 wherein:
said storage means includes a capacitor;
said charging circuit includes a discharge blocking resistor connected in parallel with said resistance means and in series with said capacitor, said charging circuit further including current blocking means connected in series with said capacitor and in parallel with said blocking resistor to form a current path to said capacitor during said selected half cycles and blocking current flow from said capacitor during said subsequent half cycles.

5. Control apparatus for use with first and second controlled loads said apparatus comprising:

means including a control circuit for connection with a pulsating current source and including a resistance means connected with a first switch means, said circuit being responsive to a predetermined condition to actuate said first switch means;

first and second load circuits including first and second controlled switch means for connection in circuit with first and second controlled loads and said source and responsive to predetermined levels of current to couple said source in circuit with said respective first and second loads; and first and second current storage means connected across said resistance means and with said respective first and second controlled switch means for storage of current during pulses of current in said control circuit for subsequent delivery to said respective first and second controlled switch means to trigger said respective controlled switch means during a subsequent pulse of current from said power source whereby said respective first and second controlled switch means may be rendered conductive early in each pulse of said pulsating current to conduct substantially full current pulses to said respective load.

6. Control apparatus for use with a controlled load and comprising:

means including a control circuit for connection with a pulsating current source and including resistance means connected with first switch means, said circuit being responsive to a predetermined condition to actuate said first switch means;

a load circuit including controlled switch means in the form of a silicon controlled rectifier for connection in circuit with said controlled load and said source and responsive to a predetermined level of current to couple said source in circuit with said load; and current blocking means connecting with the cathode of said rectifier and with the side of said resistance means adjacent said power source for blocking discharge of said storage means into said control circuit and defining a path for current to bypass said resistor means when said controlled switch means is closed;

current storage means connected across said resistance means and between the gate and cathode of said rectifier for storage of current during pulses of current in said control circuit for subsequent delivery to said gate to trigger said rectifier during a subsequent pulse of current from said power source whereby said rectifier may be rendered conductive early in each pulse of said pulsating current to conduct substantially full current pulses to said load.

7. Control apparatus as set forth in claim 1 wherein:
said load circuit includes a resistor connecting said storage means with said controlled switch means to control the rate of discharge thereto.

8. Control apparatus as set forth in claim 1 wherein:
said control circuit includes current limiting means connected across said current storage means for maintaining the charging rate thereof substantially constant.

9. Control apparatus as set forth in claim 1 wherein:
said control circuit includes an adjustable resistor in circuit with said storage means for controlling the charge rate thereof.

10. Control apparatus as set forth in claim 5 wherein:
said second load circuit includes adjustable means for controlling the rate of discharge from said second current storage means whereby the time delay between operation of said first controlled switch means and said second controlled switch means may be adjusted.

* * * * *